US012559970B2

(12) United States Patent
Rapp et al.

(10) Patent No.: US 12,559,970 B2
(45) Date of Patent: Feb. 24, 2026

(54) LATCH

(71) Applicant: SACS Aerospace GmbH, Empfingen (DE)

(72) Inventors: Andreas Rapp, Dornhan (DE); Albert Halfeev, Balingen (DE)

(73) Assignee: SACS Aerospace GmbH, Empfingen (DE)

( * ) Notice: Subject to any disclaimer, the term of this patent is extended or adjusted under 35 U.S.C. 154(b) by 172 days.

(21) Appl. No.: 17/394,677

(22) Filed: Aug. 5, 2021

(65) Prior Publication Data

US 2022/0042348 A1 Feb. 10, 2022

(30) Foreign Application Priority Data

Aug. 7, 2020 (DE) .......................... 102020210057.8

(51) Int. Cl.
*E05B 15/00* (2006.01)
*B64C 1/14* (2006.01)
(Continued)

(52) U.S. Cl.
CPC ............ *E05B 15/0013* (2013.01); *B64C 1/14* (2013.01); *E05B 5/00* (2013.01); *E05B 13/002* (2013.01); *E05B 15/006* (2013.01); *E05C 3/048* (2013.01)

(58) Field of Classification Search
CPC ............. Y10T 292/0917; Y10T 70/577; Y10T 70/5761; Y10T 292/1083; Y10T 292/1084;
(Continued)

(56) References Cited

U.S. PATENT DOCUMENTS 2,479,921 A * 8/1949 Gander ................... E05C 3/122
                                                          292/DIG. 31
2,559,736 A * 7/1951 Scarborough ........... E05C 3/122
                                                          292/DIG. 31
(Continued)

FOREIGN PATENT DOCUMENTS

DE        3150388 A1 * 9/1982 ....... Y10T 292/0917
DE    102005056144 A1 * 5/2007 ......... E05B 17/2034
(Continued)

OTHER PUBLICATIONS

DE202011106944U1 Espacenet machine translation Oct. 20, 2011 (Year: 2023).*

*Primary Examiner* — Steven A Tullia
(74) *Attorney, Agent, or Firm* — Hoffmann & Baron, LLP

(57) ABSTRACT

A latch for coupling of a first component to a second component, the latch having a base body which includes a first bearing, a second bearing and a third bearing, the latch having a lever which is mounted pivotably on the first bearing about a first pivot axis between a locking position and an unlocking position, the latch having a locking which is mounted pivotably on the second bearing and which includes a spring-loaded locking part, which locking part rests on the lever in order to transmit a predetermined braking force to the lever in the locking position of the lever, the latch further including a release lever which is mounted movably on the third bearing between a blocking position for blocking the locking in the locking position and a release position for releasing the locking from the locking position.

13 Claims, 10 Drawing Sheets

(51) Int. Cl.

| | |
|---|---|
| *E05B 5/00* | (2006.01) |
| *E05B 13/00* | (2006.01) |
| *E05C 3/04* | (2006.01) |

(58) Field of Classification Search

CPC ............. Y10T 292/57; Y10T 292/0951; Y10T 292/0952; E05B 15/0013; E05B 15/006; E05B 13/002; E05B 5/00; E05B 5/006; E05B 15/0053; E05B 15/0086; E05B 19/14; E05B 19/10; E05B 19/12; E05B 19/145; E05B 13/00; E05B 17/20; E05B 17/2007; E05B 17/203; E05B 17/2038; E05B 41/00; B64C 1/14; E05C 3/048; E05C 3/00; E05C 3/006; E05C 3/008; E05C 3/02; E05C 3/04; E05C 3/047; E05C 3/12; E05C 3/122; E05C 3/14; E05C 3/162; Y10S 292/31

See application file for complete search history.

(56) References Cited

U.S. PATENT DOCUMENTS

| | | | | |
|---|---|---|---|---|
| 2,610,880 | A * | 9/1952 | Gayner | E05C 3/122 |
| | | | | 292/DIG. 31 |
| 2,710,214 | A * | 6/1955 | Mills | E05C 19/145 |
| | | | | 292/113 |
| 2,927,812 | A * | 3/1960 | Smith | E05C 3/122 |
| | | | | 292/DIG. 31 |
| 3,743,336 | A * | 7/1973 | Andrews | E05C 1/145 |
| | | | | 292/191 |
| 4,307,905 | A * | 12/1981 | Poe | E05C 3/122 |
| | | | | 292/DIG. 31 |
| 5,560,659 | A * | 10/1996 | Dault | E05B 85/18 |
| | | | | 292/336.3 |
| 6,606,889 | B1 | 8/2003 | Tweedy | |
| 6,755,448 | B2 * | 6/2004 | Jackson | B64D 29/06 |
| | | | | 244/129.4 |
| 9,120,577 | B1 * | 9/2015 | Baic | E05B 65/1026 |
| 9,169,678 | B2 * | 10/2015 | Rozema | E05B 51/023 |
| 10,173,782 | B2 * | 1/2019 | Hernandez | E05C 19/145 |
| 10,352,074 | B2 * | 7/2019 | Hernandez | B64D 29/06 |
| 11,702,994 | B2 * | 7/2023 | McMahan | B64D 29/00 |
| | | | | 60/39.1 |
| 2002/0195827 | A1 * | 12/2002 | Jackson | E05B 65/102 |
| | | | | 292/219 |
| 2005/0087996 | A1 * | 4/2005 | Jackson | E05C 3/06 |
| | | | | 292/336.3 |
| 2006/0061108 | A1 * | 3/2006 | Meineke | B64D 29/06 |
| | | | | 292/110 |
| 2006/0214431 | A1 * | 9/2006 | Helsley | B64D 29/06 |
| | | | | 292/113 |
| 2011/0109103 | A1 * | 5/2011 | Huston | B64C 1/1407 |
| | | | | 292/164 |
| 2012/0242096 | A1 * | 9/2012 | Rozema | E05B 63/0069 |
| | | | | 292/202 |
| 2014/0035296 | A1 * | 2/2014 | Jackson | E05C 19/02 |
| | | | | 292/194 |
| 2014/0062099 | A1 * | 3/2014 | Kakita | E05B 17/0025 |
| | | | | 292/66 |
| 2015/0232189 | A1 * | 8/2015 | Hernandez | E05C 3/08 |
| | | | | 292/200 |
| 2016/0347465 | A1 * | 12/2016 | Mellor | B64D 29/06 |
| 2017/0037667 | A1 * | 2/2017 | Do | E05B 51/023 |
| 2018/0128028 | A1 * | 5/2018 | Hernandez | E05B 53/00 |
| 2021/0108454 | A1 * | 4/2021 | Boyer | E05C 3/162 |
| 2022/0042348 | A1 * | 2/2022 | Rapp | E05B 13/002 |

FOREIGN PATENT DOCUMENTS

| | | | | |
|---|---|---|---|---|
| DE | 202009016650 U1 * | 6/2010 | | B65D 43/22 |
| DE | 202011005589 U1 * | 9/2011 | | E05B 13/002 |
| DE | 202011106944 U1 * | 3/2012 | | E05B 15/101 |
| DE | 202020104021 U1 | 8/2020 | | |
| DE | 102020205373 A1 * | 10/2021 | | B64D 29/06 |
| EP | 0306223 B1 * | 5/1991 | | E05B 15/0006 |
| EP | 1197619 A1 * | 4/2002 | | B64D 29/06 |
| EP | 2551199 A1 * | 1/2013 | | B64D 29/06 |
| EP | 2907946 A1 * | 8/2015 | | B64D 29/06 |
| EP | 2507452 B1 * | 9/2018 | | E05B 5/00 |
| EP | 3950508 A1 * | 2/2022 | | B64C 1/14 |
| ES | 2647219 T3 * | 12/2017 | | E05B 13/002 |
| FR | 3075847 A1 * | 6/2019 | | E05B 5/00 |
| GB | 2168744 A * | 6/1986 | | E05C 3/122 |
| WO | WO-2009100030 A2 * | 8/2009 | | E05B 13/002 |
| WO | WO-2011069103 A1 * | 6/2011 | | E05B 5/00 |
| WO | WO-2017127776 A2 * | 7/2017 | | |

* cited by examiner

81

81

81

LATCH

BACKGROUND OF THE INVENTION

The invention relates to a latch for temporary, releasable coupling of a first component to a second component.

Latches are used, for example, in aircraft construction to releasably lock movable fairing parts to supporting elements or fixed fairing parts in the aircraft cabin, in particular to make areas which are covered by the movable fairing parts accessible for maintenance or repair purposes. Since pressure variations may occur within the aircraft cabin during an operation of an aircraft, there is a need for some movable fairing parts to form an interlock with a support element or a fixed fairing part in such a way that an automatic opening movement for the movable fairing part is enabled in case of an occurrence of pressure differences between the area covered by the movable fairing part and an area adjacent thereto.

SUMMARY OF THE INVENTION

The task of the invention is to provide a latch which realizes a simplified design while maintaining the known functional scope.

This task is solved for a latch which is designed for temporary, releasable coupling of a first component to a second component, with the following features:

The latch has a base body which is designed to be fixed to a first component and which comprises a first bearing, a second bearing and a third bearing. Furthermore, the latch has a lever which can be pivoted on the first bearing about a first pivot axis between a locking position to lock a second component and an unlocking position to unlock the second component. The latch having a locking which is mounted movably on the second bearing and which has a resiliently supported, in particular a spring-loaded, locking part which, in a locking position of the locking, is designed to bear against the lever in order to transmit a predetermined braking force to the lever in the locking position of the lever. In addition, the latch has a release lever which is mounted movably, in particular pivotably, on the third bearing, which is designed in a blocking position for blocking the locking in the locking position and in a release position for releasing the locking from the locking position.

The main function of the latch is the releasable coupling of the first component to the second component, wherein the first component is connected to the second component via at least one articulated connection, such as a hinge. The first component is used in the manner of a door or maintenance flap for closing a recess in the second component, wherein the latch and the hinge are arranged on opposite sides of the first component. The latch is used to hold the first component in a closed position, in which the recess in the second component is closed. Furthermore, the latch enables manual actuation, preferably without tools, by an operator. For this purpose, it is provided that the operator exerts an operating force, in particular a manual force, on the release lever in order to transfer the release lever from the blocking position to a release position by a swivel movement. This removes the blocking of the locking so that the locking can be moved from the locking position to a release position. In the release position of the locking, an operative connection between the spring-elastically supported locking part of the locking and the lever is cancelled, so that the locking does not exert any braking force on the lever and the lever can be moved from the locking position into the release position either by an actuating movement of an operator or by a spring. In this release position, a relative movement, in particular a swivel movement about the hinge is enabled between the first component and the second component.

In addition, the latch enables automatic decoupling of the first component from the second component. For the automatic decoupling it is assumed that there is a force acting on the first component which exceeds a predefined maximum holding force of the latch. For example the first component and the second component are used to separate a first space from a second space and. Due to a pressure difference between the first space and the second space, a compressive force acts on the first component that is above a predetermined force level. In this case, the latch ensures that the coupling between the first component and the second component is cancelled due to the predetermined and limited braking force transmitted by the locking to the lever. In this situation a torque acts on the lever due to the coupling of the first component with the second component, which torque exceeds a braking torque determined by the braking force exerted on the lever by the locking. If a compressive force or overpressure is acting on the first component, a pivoting movement of the lever from the locking position to the unlocking position takes place. In this situation no movement of the locking and/or the release lever is being required. Rather, it is sufficient if either a frictional force exerted by the elastically supported locking part on the lever is overcome or if a positive coupling present with respect to the pivoting movement of the lever between the locking part and the lever in the locking position is cancelled by a relative movement of the locking part with respect to the lever.

It is expedient if the locking comprises a locking housing which is received movably, preferably linearly movably and/or pivotably about a second pivot axis, on the second bearing. The locking housing may be designed as a bearing journal. A recess is formed in the locking housing for receiving a spring, which recess is aligned transversely with respect to the second pivot axis and is arranged at a distance from the second pivot axis. The locking part projects with a locking region beyond an outer surface of the locking housing. The pivotable mounting of the locking housing on the second bearing ensures a cost-effective provision of the relative mobility for the locking.

Preferably the second bearing is designed as a bearing journal which is fixed to the base body and which passes through a corresponding recess, in particular a circular cylindrical bore, in the locking housing. The locking housing has a recess in which a spring and a locking part are accommodated. The task of the spring, which is accommodated with an internal preload in the locking housing, is to exert a spring force on the locking part so that the locking part can be held in a preferred position relative to the locking housing within a predetermined force interval. The force interval determined by the spring for the locking part depends on the braking force to be exerted by the locking part on the lever. On the one hand, this braking force depends on the predefined conditions under which it should be possible for the lever to be released automatically without the locking and the release lever being actuated for this purpose.

On the other hand, the braking force depends on the way in which a power transmission from the locking part to the lever is provided. For example, a force transmission can be provided exclusively by friction, so that the braking force transmitted from the locking part to the lever depends on a material pairing of the locking part and the lever and a friction coefficient dependent thereon, as well as on a normal force transmitted from the locking part to the lever in a normal direction.

Alternatively, a combined frictional and positive-locking force transmission can be provided, in which the locking part engages in a recess in the lever, so that a pivoting movement of the lever relative to the locking part requires both an overcoming of the frictional forces as well as a displacement of the locking part against the internal pretension of the spring. Such a combined frictional and positive force transmission between the locking part and the lever has the advantage that a significant component of the braking force can be determined by influencing the geometry of the locking part, which is in direct contact with the lever, in particular with a recess formed in the lever. In contrast, the influence of the frictional forces between the locking part and the lever can be kept significantly lower, which allows a more precise tuning of the release behaviour for the latch.

Preferably, it is provided that the locking region engages in a correspondingly formed recess in the lever, which is formed in a lever end face of the lever, wherein a surface normal of the lever end face is aligned transversely to the first pivot axis. By adapting the geometry of the recess in the lever to the geometry of the locking part that is in contact with the lever in the locking position of the locking and the locking position of the lever, an advantageous definition of the braking force to be transmitted from the locking part to the lever in the locking position of the locking and the locking position of the lever is possible within a narrow tolerance band. Preferably a geometry of the locking part which is received in the recess in the lever and a geometry of the recess in the lever are geometrically similar, in particular identical. Preferably, it is provided that an adjustment of the braking force is made by a variation of the internal preload of the spring pressing the locking member against the lever.

In one embodiment of the invention, it is provided that the release lever is mounted on the third bearing such that it can pivot about a third pivot axis and has a third end face whose surface normal is aligned transversely with respect to the third pivot axis, the third end face being designed, in the blocking position, for bearing against a protrusion of the locking which has a greatest extent aligned parallel to the third pivot axis, in order to prevent a movement, preferably a linear movement, particularly preferably a pivoting movement of the locking, out of the locking position. The task of the release lever is to allow a pivoting movement of the locking out of the locking position, provided this is effectuated by an operator by initiating a release movement on the release lever.

The pivotable mounting of the release lever on the base body by means of the third bearing can ensure a cost-effective realization of the relative mobility between the release lever and the base body. With regard to the locking of the locking in the locking position, which is to be ensured by the release lever in the absence of an operating force of an operator, it is advantageous if a third end face of the release lever is aligned in such a way that a force which is transmitted by the locking to the release lever does not lead to an undesired displacement of the release lever from the locking position. For this purpose, it is provided that a surface normal of the third end face is aligned transversely to the third pivot axis. This design ensures that when a force is applied to the third end face, in particular in the direction of the surface normal of the third end face, no undesirable torque is generated on the release lever, thus avoiding an equally undesirable deflection of the release lever from the blocking position. In order to ensure such a force introduction for the release lever, which is aligned parallel to the surface normal of the third end face, it is additionally to be provided that a first end face of the locking, which in the locking position of the locking and the blocking position of the release lever is aligned opposite the third end face of the release lever in such a way that even when a torque is introduced onto the locking, a force resulting from this torque acts on the third end face of the release lever, which is aligned coaxially with the surface normal of the third end face.

Advantageously, a projection of the third end face onto a projection plane which is oriented transversely to a surface normal of the third end face intersects with the third pivot axis. In particular the surface normal of the third end face intersects with the third pivot axis. Preferably, the third end face is formed as a planar rectangle, so that a projection (meaning an optical or mathematical projection) of the third end face onto a projection plane oriented at a right angle, i.e. transversely, to the surface normal is also formed as a rectangle. Accordingly, this rectangle surrounds or comprises the third pivot axis, the length of which is infinite, at least in mathematical terms, so that for this case the formulation is chosen that the projection of the third end face intersects the third pivot axis. It is particularly advantageous if the surface normal of the third end face intersects the third pivot axis. Preferably, in this context, it is assumed that the surface normal starts from a center point or center of gravity of the third end face. In the case of a curved third end face, a resulting surface normal can be determined, which can be defined, for example, on the basis of a surface center of gravity and a weight-force vector emanating from this surface center of gravity.

In a further development of the invention, it is provided that the locking housing is arranged between the second pivot axis and the third pivot axis in such a way that a pivoting movement of the locking between the locking position and a release position and a pivoting movement of the release lever between the blocking position and the release position are oriented in a first pivoting direction, and that the lever is arranged in such a way that a pivoting movement of the lever from the locking position into the unlocking position takes place in a second pivoting direction which is oriented opposite to the first pivoting direction. Preferably, it is provided that the locking and the release lever are adapted to one another in such a way that, when the release lever is actuated in the form of a pivoting movement about the third pivot axis, a pivoting movement of the locking in the same direction about the second pivot axis takes place. In particular both a pivot angle for the locking and a pivot angle for the release lever are chosen within an angular interval of less than 20 degrees.

Furthermore, it can be provided that geometries of the locking and the release lever are adapted to each other in such a way that a mutual pivoting angle limitation for the pivoting movements of the locking and the release lever is ensured. It is particularly advantageous if the third end face of the release lever rests against a corresponding surface section of the locking in the release position of the locking and the release lever, whereby the desired pivoting angle limitation for the pivoting movements of the latch and the release lever is achieved.

Advantageously, the first pivot axis, the second pivot axis and the third pivot axis are aligned parallel to each other.

In a further embodiment of the invention, it is provided that a spring is associated with the release lever and the locking, which spring is designed for introducing torques directed in opposite directions onto the release lever and the locking and/or that a spring is associated with the lever, which spring is designed for providing a torque directed into the release position onto the lever. Preferably, it is provided that a spring associated with the release lever and the locking exerts a spring force or a torque on the release lever which results in the release lever being biased into the blocking position while the locking is biased into the release position. Accordingly, a deflection of the release lever from the blocking position into a release position, as can be caused by the application of force by a user, leads to an automatic pivoting movement of the locking from the locking position into the release position. This cancels the transmission of the braking force from the locking, in particular from the locking part, to the lever. The lever is preferably connected to a spring that is preloaded in such a way that the lever is transferred from the locking position to the release position while reducing the internal preload of the spring.

It is expedient if, in the locking position, the lever rests with a first end region on a housing section of the locking housing and/or that, in the release position of the release lever, the protrusion of the locking rests against a support surface arranged adjacent to the third end face of the release lever. This design of the lever and of the locking housing ensures that after a manual release of the latch, in which both the lever is pivoted out of the locking position into the unlocking position and the release lever and the locking are pivoted in the same direction, a pivoting movement of the lever in the direction of the locking position also causes a corresponding, in particular opposite, pivoting movement of the locking out of the release position into the locking position.

Preferably, the lever and the locking are adapted to each other in such a way that when the lever is pivoted from the unlocking position into the locking position, for which purpose a force application to the lever is required anyway in order to increase the internal pretension of the spring, a force transmission to the locking takes place, whereby the locking can also be transferred from the unlocking position into the locking position while increasing the internal pretension of the spring.

It is particularly advantageous if, in the course of the pivoting movement of the locking into the locking position, the release lever also assumes the blocking position relative to the locking due to the internal pretension of the associated spring without any further action on the part of the user. In such an embodiment of the latch, a single actuating movement is sufficient to move both the coupling between the first component and the second component and the transfer of the movable components: lever, locking and release lever of the locking into the respective functional position, in which the desires coupling between the first component and the second component is maintained until either a manual release or an automated release of the latch occurs.

Preferably, it is provided that the lever is displaceable from the locking position to the unlocking position without requiring a movement of the locking from the locking position and without requiring a movement of the release lever from the blocking position if the braking force which is exerted by the resiliently supported locking member is overcome. To perform this function, the elastically supported locking part is provided, which, depending on a design of the lever, provides either a braking force which is transmitted as a frictional force or is transmitted by a combination of a frictional force and a deformation force for the spring of the locking occurring due to the form-fitting coupling between the locking part and the lever when the lever is deflected from the locking position into the unlocking position.

It is particularly preferred that the lever is formed in one piece, so that there is no separation between a section of the lever provided for contact with the second component and a section of the lever provided for actuation by an operator. The counterholder arranged at the end of the lever and intended for direct contact with the second component is not included in this definition, since the counterholder is preferably intended to permit a variable positioning relative to the lever in order to permit adjustment of the latch.

In an alternative embodiment of the latch, it is provided that the locking housing is mounted on the base body so as to be linearly movable and that a spring, which is supported on the base body, is designed to provide a spring force aligned in the direction of the release lever. When the release lever is moved from the locking position to the release position, a linear movement of the locking housing is thus enabled, whereby the locking region of the locking is moved away from the lever in such a way that the lever can be pivoted out of the locking position by an operator without any major effort. This results in a relaxation of the spring which is supported on the base body, whereby it is preferably provided that the spring also has an internal pretension in the release position in order to ensure a defined positioning for the locking.

In a further development of the latch, it is provided that a first control surface is formed on the locking housing and that a second control surface is formed on the lever, which first control surface and second control surface are designed for initiating a compressive movement on the spring when the lever is transferred from the release position to the locking position. Due to the interaction between the first control surface and the second control surface, the locking housing undergoes a linear movement against the spring force of the spring when the lever is transferred from the release position to the locking position and is thus transferred back to its locking position. This ensures particularly convenient actuation of the latch.

Preferably, it is provided that the first control surface is circular-cylindrical and a center axis of the first control surface is aligned parallel to the center axis of the first bearing, and that the second control surface is formed as a plane or as a section of a cylindrical lateral surface. Exemplarily, the first control surface is formed by a bolt connected to the locking and having a central axis oriented parallel to the central axis of the first bearing. Particularly preferably, this bolt is fixed to an extension arm which is extended along a linear axis of movement of the locking and in the direction of the first bearing.

BRIEF DESCRIPTION OF THE DRAWINGS

Advantageous embodiments of the invention are shown in the drawings. Here shows.

DETAILED DESCRIPTION

The latch 1 shown in FIGS. 1 to 6 in different states serves for the temporary, releasable coupling of a first component 21 to a second component 22. Exemplarily, the first component 21 may be a door or maintenance hatch which may pivotally act on a (or is hinged with a) second component 22 such as a wall section in a building or an interior panel in an aircraft. A total of three different states are distinguished for the latch 1.

The first state can be described by the first component 21 being coupled to the second component 22 with the aid of the latch 1, so that, for example, a pivoting movement of the first component 21 relative to the second component 22 is prevented.

The second state can be described in that the latch 1 is brought, for example during maintenance work, intention-ally by manual intervention of a user into a preferred position not shown in more detail, in which a pivoting movement of the first component 21 relative to the second component 22 is enabled.

In the third state, a pivoting movement of the first component 21 with respect to the second component 22 takes place, wherein the latch 1 releases a locking condition between the first component 21 and the second component 22 without an interaction of a user.

By way of example, it can be provided that such a release takes place in the event that a pressure difference between a first space and a second space, which are separated from one another by the first component 21 and the second component 22, exceeds a predefined threshold value, and thus a pressure force occurring in a pivoting direction for the first compo-nent 21 is greater than a maximum locking force of the latch 1.

Figure 1:
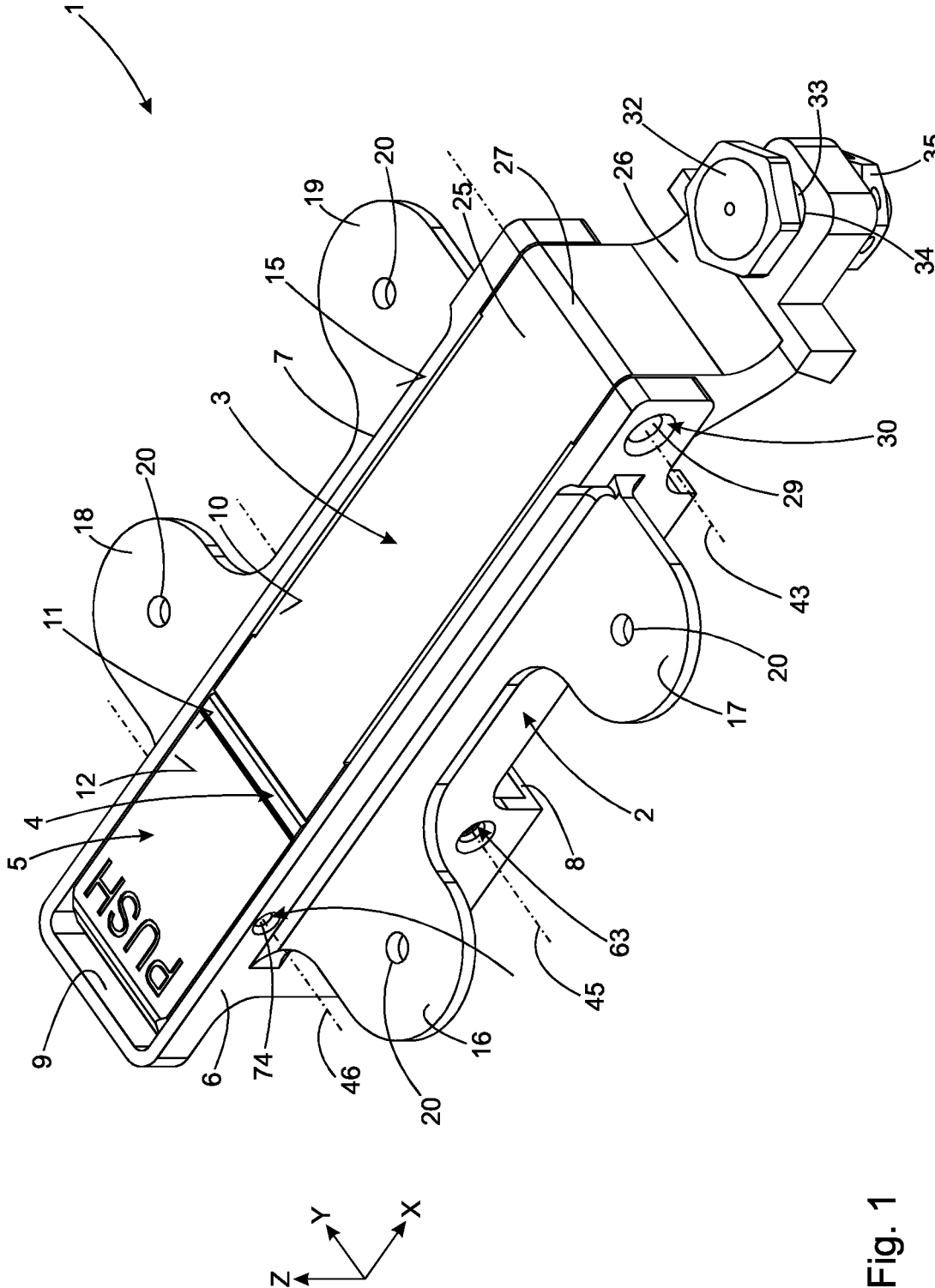
FIG. 1 a perspective view from above on a latch, in which a lever is in a locking position and a locking and a release lever are in a blocking position, FIG. 2 a lateral sectional view of the latch according to FIG. 1, FIG. 3 the latch according to FIGS. 1 and 2, in which the locking and the release lever are in a release position in which a pivoting movement of the lever is enabled, FIG. 4 the latch according to FIGS. 1, 2 and 3 with the lever fully moved into the unlocking position, FIG. 5 the latch according to FIGS. 1, 2, 3 and 4, in which a pivoting movement of the lever results from a torque acting on the lever which torque exceeds a braking force of the locking, FIG. 6 the latch according to FIGS. 1 to 5 with the lever fully pivoted into the unlocking position, FIG. 7 a second embodiment of a latch shown in a closed position, in which the locking is mounted on the base body so that it can move linearly, FIG. 8 the second embodiment of the latch according to FIG. 7 in a first open position, which is a result of an actuation by a user, FIG. 9 the second embodiment of the latch according to FIG. 7 in a second open position, which is due to an overpressure-induced release of the lever, and FIG. 10 the second embodiment of the latch according to FIG. 7 in a fully open position after release due to over-pressure.

According to the perspective view of FIG. 1, the latch 1 comprises a base body 2 to which a lever 3, a locking 4 and a release lever 5 are attached.

For the following description of the latch 1, reference is made to the Cartesian coordinate system used in FIGS. 1 to 6 with an X-axis extending along the longest extent of the latch 1, a Y-axis angled 90 degrees thereto, and a Z-axis angled 90 degrees to both the X-axis and the Y-axis.

By way of example, it is provided that the base body 2 has a U-shaped profiling in a cross-sectional plane not shown, which is spanned by the Y-axis and the Z-axis. This U-shaped profiling of the base body 2 is formed by a first side wall 6, which forms a first U-leg, a second side wall 7, which forms a second U-leg, and a connecting section 8, the connecting section 8 being aligned transversely to the first side wall 6 and to the second side wall 7, respectively. It is further provided that the first side wall 6 and the second side wall 7 are each aligned parallel to each other.

Figure 2:
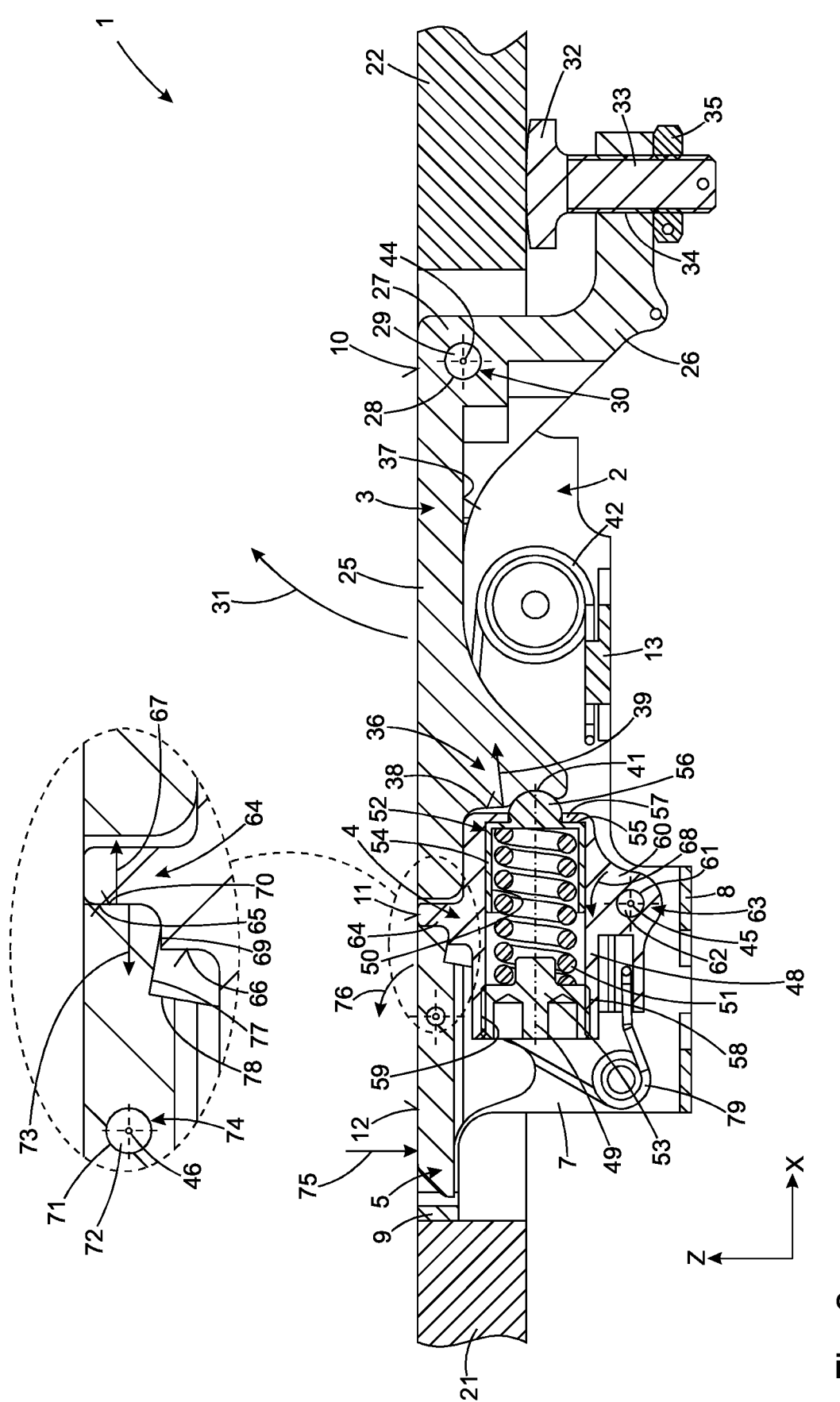

In a basic position of the latch 1, as shown in FIGS. 1 and 2, the lever 3, the locking 4 and the release lever 5 are accommodated on the base body 2 in such a way that an upper side 10 of the lever 3, an upper side 11 of the locking 4 and an upper side 12 of the release lever 5 are arranged in a common plane which is arranged parallel to a plane (not shown) which comprises the Y axis and the Z-axis and which is aligned parallel to a U-shaped end face 15 of the base body 2.

By way of example, the latch 1 is designed to be mounted on a plate-shaped first component 21 which is not shown, the first component 21 being provided for this purpose with a slot-shaped recess which corresponds to a geometry of the U-shaped end face 15 of the base body 2. Accordingly, when the latch 1 is mounted on the first component 21, the respective fastening tongues 16, 17, 18 and 19 projecting from the first side wall 6 and the second wall 7 come into flat contact with a rear side, which is not shown, of the first component 21 and enable the latch 1 to be fixed to the first component 21 by means of screws to be screwed through the respective fastening holes 20.

As can be seen from the sectional views of FIGS. 2 to 6, the lever 3 comprises a first lever section 25 extending with its greatest extension along the X axis and a second lever section 26 connected integrally to the first lever section 25 and profiled in an L-shape. A connecting region 27 between the first lever section 25 and the second lever section 26 is penetrated by a first recess 28, formed as a circular cylin-drical bore, in which a first bearing pin 29 is accommodated, which extends between the first side wall 6 and the second side wall 7 and which, together with the first recess 28, forms a first bearing 30. The first bearing 30 enables a pivoting movement of the lever 3 relative to the base body 2 about a first pivot axis 44. Due to the arrangement and geometric configuration of the lever 3 and the locking 4, the lever 3, starting from the locking position as shown in FIGS. 1 and 2, can exclusively perform a pivoting movement along an arcuate pivoting path 31 which is oriented in a clockwise direction according to FIGS. 2 to 6.

Figure 4:
Figure 5:
Figure 5:
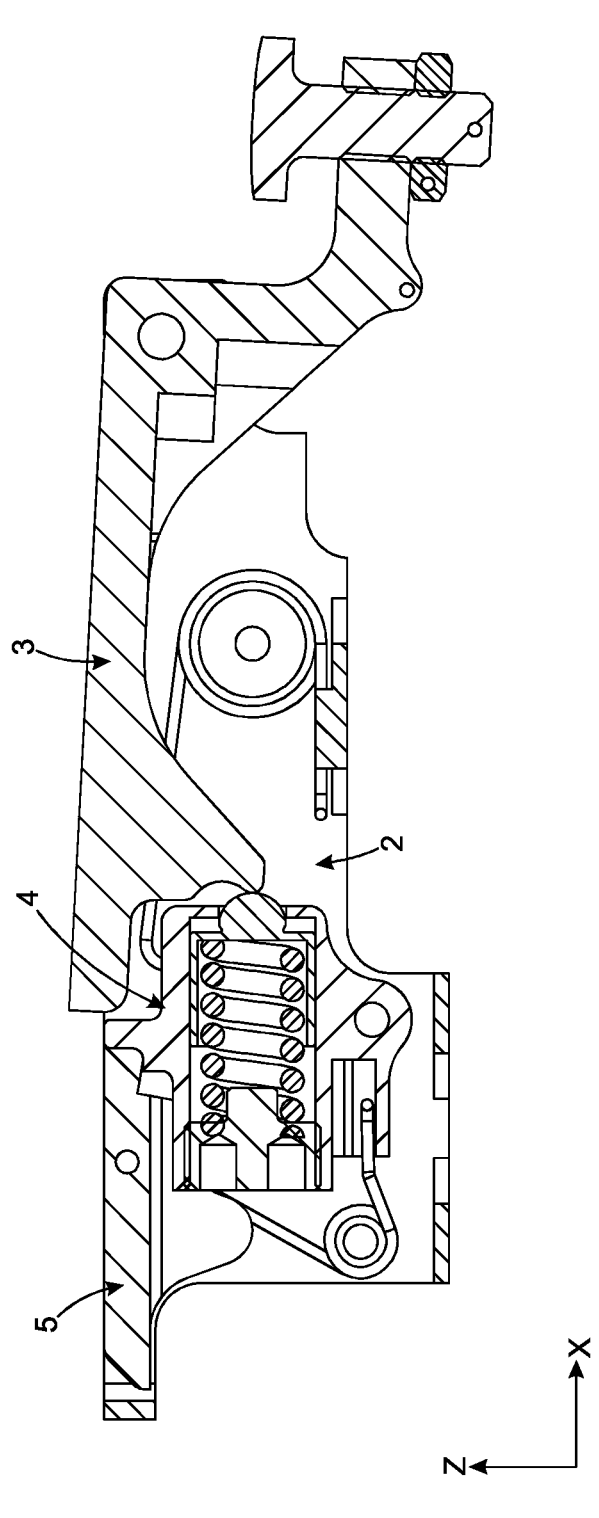
Figure 6:

During the pivoting movement of the lever 3 from the locking position according to FIG. 2 to an unlocking posi-tion as shown in FIGS. 4 and 6, a counterholder 32 which is arranged at the end of the second lever section 26 leaves a locking position, which can be seen in FIG. 2, with the second component 22. Thus a transmission of force between the first component 21 and the second component 22 is cancelled and a pivoting movement of the first component 21 with the latch 1 attached thereto can be carried out with respect to the second component 22. Purely by way of example, it is provided that the counterholder 32 is screwed with a screw portion 33 into a threaded hole 34 of the second lever section 26, whereby an adjustment of the counter-holder 32 relative to the second component 22 can be performed. To secure a position of the counterholder 32 on the second lever section 26, a lock nut 35 is provided which can be screwed onto the screw section 33 of the counter-holder 32 and can be supported on the second lever section 26.

A detent protrusion 36 is formed on the first lever section 25 at an end region of the first lever section 25 remote from the second lever section 26. This detent protrusion 36 extends from an underside 37 of the lever 3 remote parallel to the upper side 10 of the lever 3 along the Z axis and has a lever end face 38 whose surface normal 39 is formed at an acute angle to the X axis and transversely to a first pivot axis 44 of the first bearing 30. The lever end face 38 is provided with a recess 41 in the shape of a spherical section, which is formed to receive a locking member 50.

A spring 42 is associated with the lever 3, which spring 42 is designed to provide a spring force directed in the direction of the arcuate pivot path 31 and which spring 42 is supported with a first end on the underside 37 of the lever 3 and with a second end on a connecting web 13 extending between the first side wall 6 and the second side wall 7.

The latch 4 comprises a locking housing 48 which is formed like a sleeve with a quadratic profiled cross-section, wherein a sleeve axis 49 of the locking housing 48 is aligned parallel to the X-axis in the representation of FIG. 2 and the quadratic profiling, which is not shown, would be visible in a cross-sectional plane comprising the Y-axis and the Z-axis. A recess 50 of the locking housing 48 accommodates a support spring 51, in particular a helical spring, and a locking part 52 and a support part 53. The locking part 52 comprises a sleeve section 54 having a circular cross-section and extending along the sleeve axis 49. The support spring 51 is received partially in the sleeve section 54. On an end face 55 of the sleeve section 54 facing away from the support spring 51, there is arranged a hemispheric formed locking region 56, which projects along the X axis in the direction of the lever 3 and which passes through an end wall 57 provided at the end of the sleeve section 54. The locking region 56 is thereby designed to be received in the recess 41 of the lever 3. At an end region of the recess 50 in the locking housing 48 facing away from the end wall 57, the support part 53 is screwed with an external thread 58 into an internal thread 59 of the locking housing 48 and thus enables axial support of the support spring 51.

The locking housing 48 has a bearing protrusion 60 projecting in the Z-direction, which bearing protrusion 60 is penetrated by a second recess 61 formed as a circular cylindrical bore. A second bearing pin 62 is accommodated in the second recess 61, which second bearing pin 62 extends between the first side wall 6 and the second side wall 7 and, together with the second recess 61, forms a second bearing 63 for pivotally supporting the locking 4 relative to the base body 2, wherein a pivoting movement of the locking 4 relative to the base body 2 takes place about a second pivot axis 45. According to FIG. 2 the bearing protrusion 60 is formed on a lower side of the locking housing 48 and a locking protrusion 64 is formed on an upper side of the locking housing 48. A maximum extension of the locking protrusion 64 extends along the Y-axis and has a stair-like profiling with a first end face 65 and a second end face 66 according to FIG. 2. It is provided that the first end face 65 and the second end face 66 are each flat and are aligned parallel to one another.

Furthermore, the first end face 65 and the second end face 66 are arranged offset with respect to each other both with respect to the X-axis and with respect to the Z-axis. A surface normal 67 of the first end face 65 is aligned parallel to the X axis. Furthermore the surface normal 67 of the first end face 65 is aligned transversely to a third bearing pin 72, which extends between the first side wall 6 and the second side wall 7 for a pivotable mounting of the release lever 5 and which determines a third pivot axis about which the release lever 5 can be pivoted relative to the base body 2. Preferably, it is provided that the surface normal 67 of the first end face 65 intersects the third bearing pin 72. In particular the surface normal 67 intersects the third pivot axis determined by the third bearing pin 72. The release lever 5 is formed substantially as a plane-parallel plate and is penetrated by a third recess 71 which serves to receive the third bearing pin 72. It is further provided that the release lever 5 has a third end face 70, the surface normal 73 of which intersects the third bearing bolt 72. The third bearing bolt 72, together with the third recess 71, forms the third bearing 74.

A spring 79 is associated with the locking 4 and with the release lever 5, which spring 79 introduces a spring force to the locking 4, which results in a torque for the locking 4 about the second bearing 63. According to FIGS. 2 to 6 this torque is oriented counterclockwise. Furthermore, the spring force of the spring 79 acting on the release lever 5 results in a torque about the third bearing 74, this torque being oriented clockwise. As a result of these two opposing torques, the first end face 65 of the locking protrusion 64 and the third end face 70 of the release lever 5 are pressed against each other. The force effect between the first end face 65 and the third end face 70 is essentially aligned parallel to the X axis, so that there is no unwanted torque on the release lever 5. In addition, the release lever 5 rests with an underside 77 adjacent to the third end face 70, preferably aligned at an acute angle to the X axis, on a horizontal surface 69 aligned parallel to the X axis and arranged between the first end face 65 and the second end face 66, thereby also ensuring support of the torque of the spring 79 acting on the release lever 5.

According to FIG. 2, the latch 1 assumes a locking position in which a coupling of the first component 21 with the second component 22 is ensured by means of the latch 1, which corresponds to the first state described above. A decoupling of the first component 21 from the second component 22 can take place in two different ways.

Figure 3:
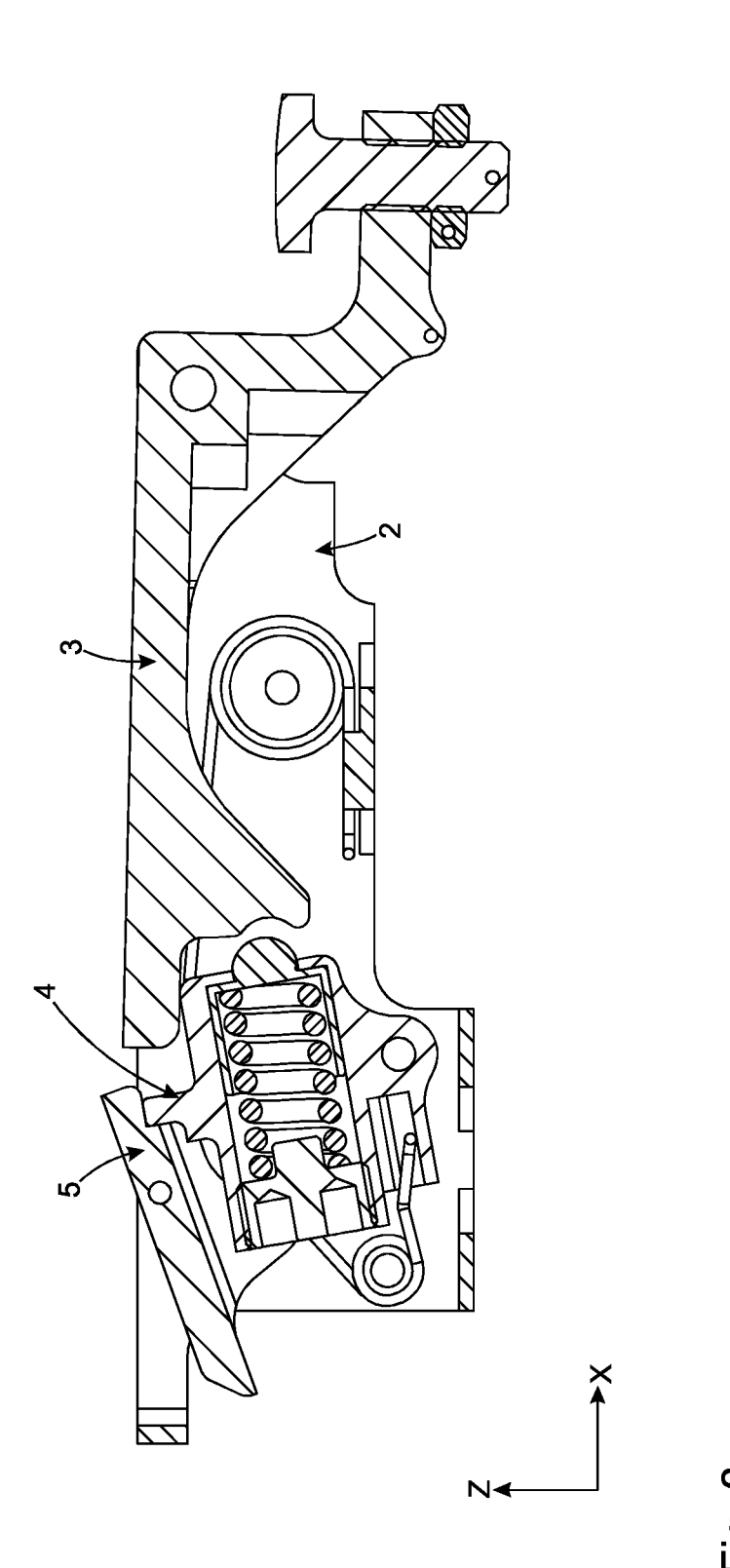

According to a first way of decoupling a manual intervention by an operator (not shown) takes place. The operator exerts an operating force 75, shown schematically in FIG. 2, on the release lever 5 in such a way that the release lever 5 is transferred from the blocking position according to FIG. 2 along an arcuate swivel path 76 aligned concentrically with the third bearing pin 72 into a release position, as shown in FIG. 3. This pivoting movement of the release lever 5 enables a pivoting movement of the locking 4 about the second bearing pin 62 wherein this pivoting movement is oriented in the same direction as the pivoting movement of the release lever 5 and is caused by the spring 79. The pivoting movement of the locking 4 ends as soon as the first end face 65 of the locking 4 comes into contact with a fourth end face 78 of the release lever 5, which is formed offset parallel to the third end face 70 on the release lever 5. Due to the pivoting movement of the locking 4, a form-fitting operative connection between the locking protrusion 64 and the lever 3 is cancelled, so that the lever 2 is transferred from the locking position as shown in FIG. 2 to the unlocking position as shown in FIG. 4 due to the internal bias of the spring 42.

In the case of a desired coupling of the first component 21 to the second component 22 using the latch 1 an operator (not shown) applies a force to the lever 3 such that the latter is moved from the unlocked position as shown in FIG. 4 and in the direction opposite to the direction of the arrow for the arcuate pivoting path 31 in the direction of the locked position, therewith increasing the internal pretension of the spring 42. Finally the underside 37 of the lever 3 comes into contact with the locking housing 48, so that if sufficient force is applied to the lever 3, a pivoting movement of the locking 4 about the second bearing 63 is also performed. In this case, an increase in the internal preload for the spring 79 takes place. Furthermore, this enables a movement of the release lever 5 from the release position according to FIGS. 3 and 4 into the blocking position according to FIG. 2, so that at the end of this coupling process the initial situation shown in FIG. 2 is again achieved.

According to a second way of decoupling, force effects are present between the first component 21 and the second component 22 which result in a force being applied in a negative direction along the Z-axis to the counterholder 32, this causes a torque to act in a clockwise direction around the first bearing 30. This torque is countered by a braking torque caused by the frictional and positive operative connection between the locking protrusion 64 and the recess 41 in the lever 3 and furthermore caused by the internal pretension of the support spring 51.

In the following description of the second embodiment of a latch 81 illustrated in FIGS. 7 to 10, components which are identical or at least functionally identical to components of the first embodiment of the latch 1 are provided with the same reference signs and are not described again.

Figure 7:
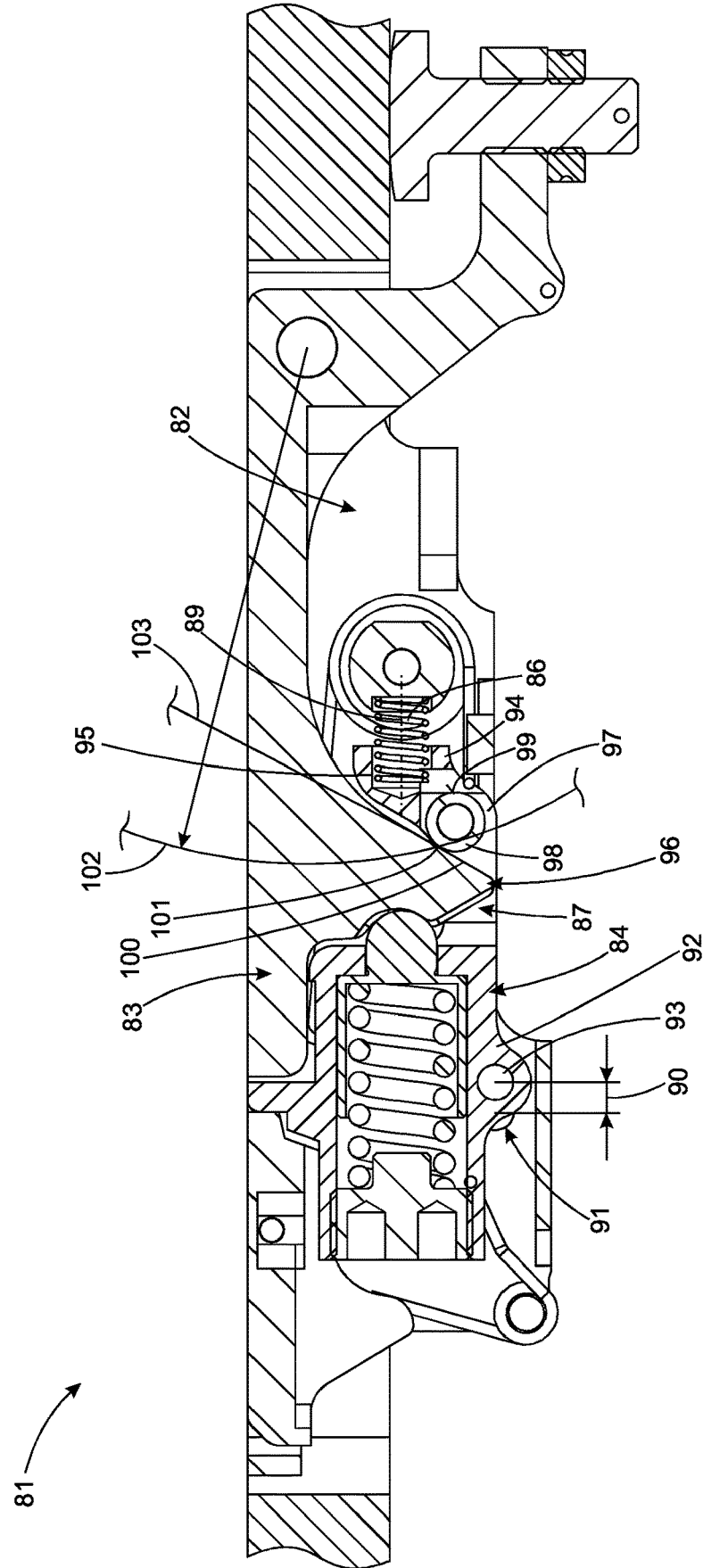

The latch 81 differs from the latch 1 in that the locking 84 is mounted on the base body 82 so as to be linearly movable and is subjected to a spring force by a spring 86, which is supported on an extension arm 87 associated with the locking 84 and on a support pin 88. For this purpose, it is provided that a central axis 89 of the spring 86 is aligned parallel to a movement axis 90 of the locking 84 and assumes a compressed position with internal spring tension in the rest position of the latch 81, as shown in FIG. 7. The axis of movement 90 of the locking 84 is determined by an elongated hole 91 in the base body 82 and a guide pin 93 received on the locking housing 92 and engaging in the elongated hole 91. Here, the elongated hole 91 serves as a slotted guide for the guide pin 93. If necessary, it can be provided that the locking housing 92 engages with a further guide bolt (not shown) in a further elongated hole in the base body 82 (also not shown) in order to ensure a clear restriction of the mobility for the locking housing 92 to a single linear degree of freedom of movement.

Preferably, it is provided that the extension arm 87, which extends from the locking housing 92 in the direction of the first bearing 30 and which is equipped at an end region 94 with a bore 95 for receiving the spring 86, in the rest position according to FIG. 7 surrounds the locking protrusion 96 of the lever 83 in a frame-like manner and thus defines a receiving region 97. In the receiving region 97, a control pin 98 is provided which is aligned transversely to the plane of representation of FIG. 7 and is arranged parallel to the first bearing 30, is connected to the cantilever 87 and has a circular-cylindrical outer surface 99 which can be referred to as the first control surface.

A surface 100 is formed on the detent protrusion 96 opposite the control pin 98 and facing away from the locking part 52, which surface 100 is also referred to as the second control surface and is provided for contacting the outer surface 99 of the control pin 98.

Figure 8:
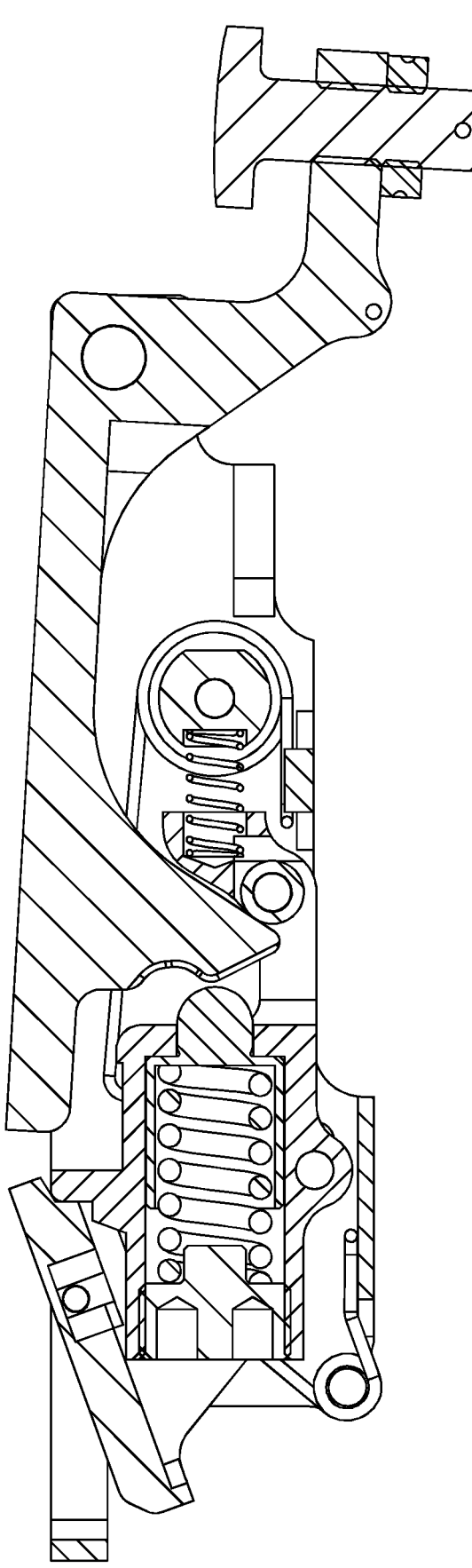
Figure 9:
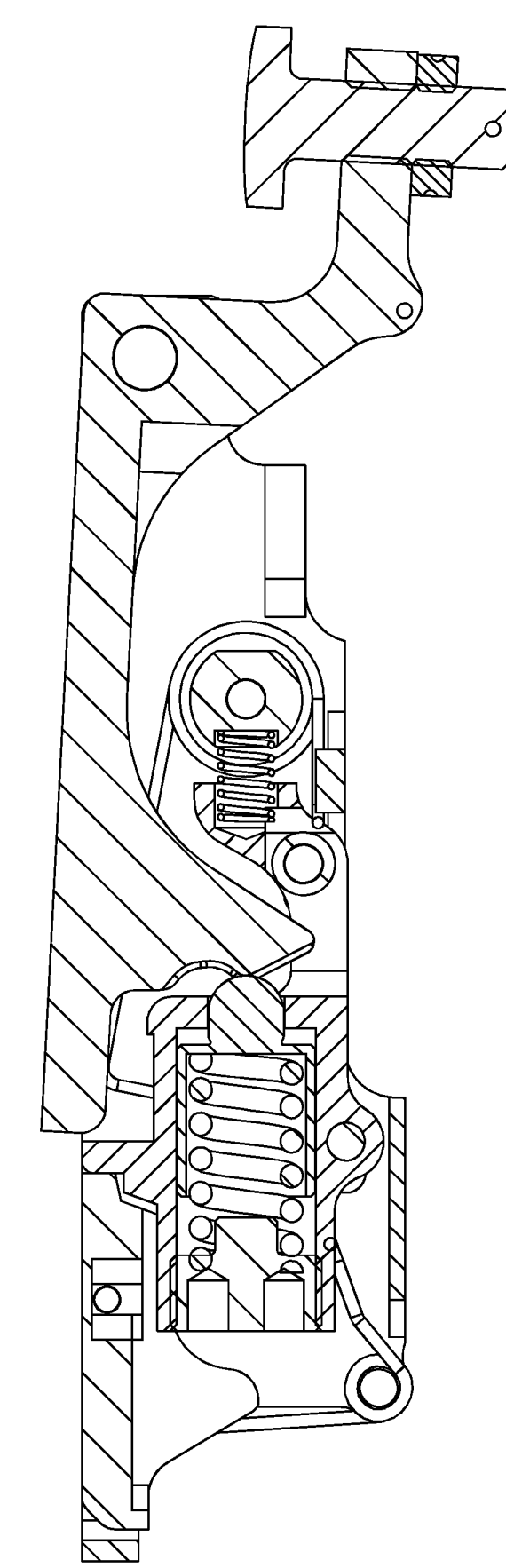

The function of the control pin 98 and the surface 100 is to enable a defined displacement of the locking 84 when performing a pivoting movement of the lever 83 from the unlocked position according to FIG. 8 to the locked position according to FIG. 7, without a user having to access the locking 84 for this purpose. Rather, the interaction of the surface 100 with the outer surface 99 causes a displacement motion for the control pin 98 from the lever 83 so that it is linearly displaced to the locking position under compression of the spring 86, thereby ensuring the locking of the lever 83. In the course of this linear displacement of the locking 84, the release lever 5 is also transferred to the locking position by the action of the spring 79.

Figure 10:
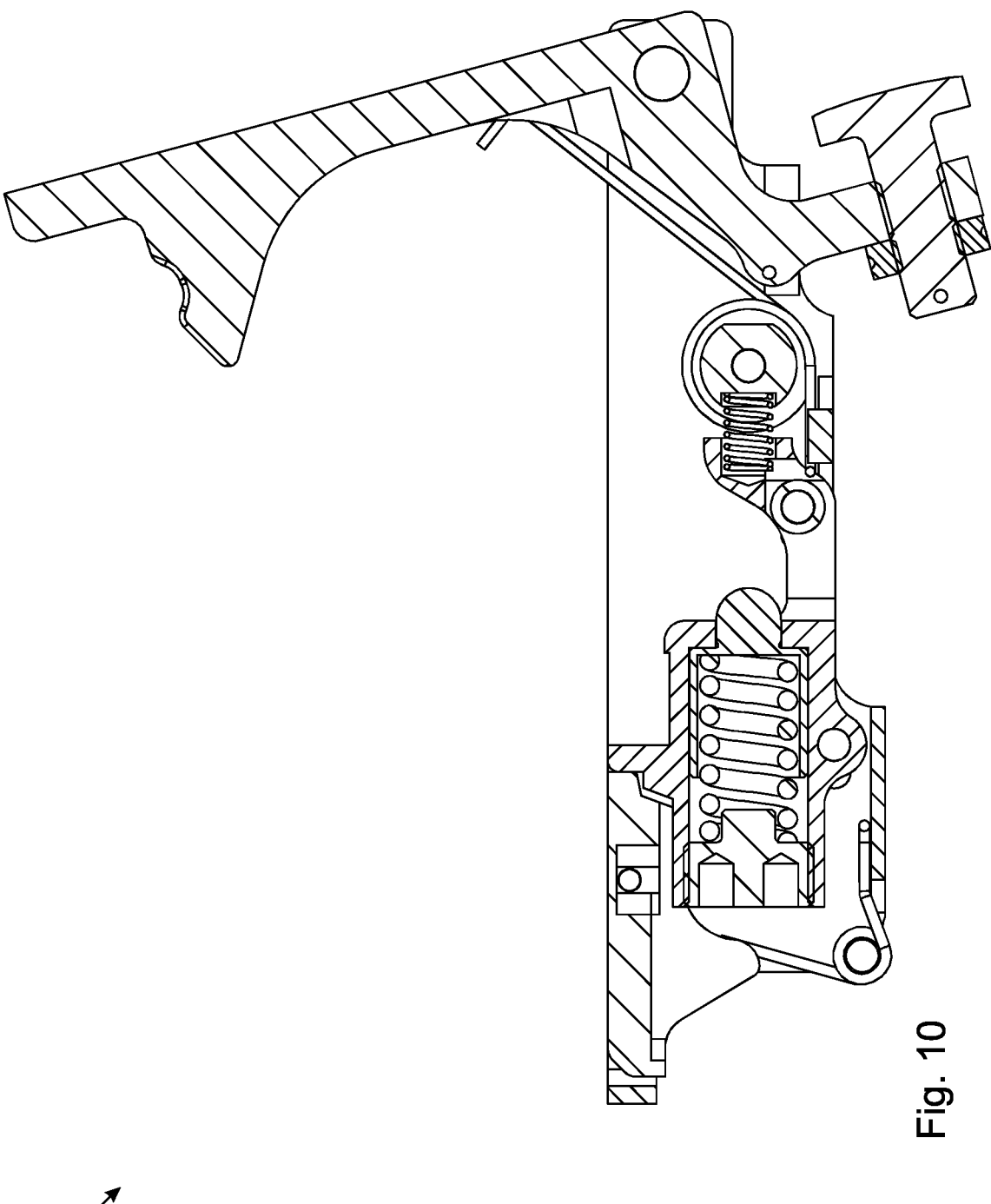

With regard to an overpressure-induced release of the latch 81, there are no significant differences compared to the latch 1. As in the case of the latch 1, the locking 84 remains in its locking position when a triggering torque defined by interaction between the locking 84 and the lever 83 is exceeded. Only the locking part 52 is linearly displaced for a short time due to the action of the overpressure-induced torque on the lever 83, so that the positive connection between the locking part 52 and the lever 83 is cancelled. As soon as this is the case, the lever 83 can be pivoted into the open position as shown in FIG. 10 without any further resistance to movement, thereby releasing the component to be locked.

What is claimed is:

1. A latch for coupling of a first component to a second component, the latch having a base body which comprises a first bearing, a second bearing and a third bearing, the latch having a lever which is mounted pivotably on the first bearing about a first pivot axis between a locking position and an unlocking position, the latch having a locking which is mounted pivotably on the second bearing about a second pivot axis, the latch further comprising a release lever which is mounted movably on the third bearing about a third pivot axis between a blocking position for blocking the locking in the locking position and a release position for releasing the locking from the locking position, wherein the locking comprises:

a locking housing having a bearing recess for receiving the second bearing, whereby the locking is pivotable about the second pivot axis;

a support spring retained within the locking housing; and a locking part movably retained within the locking housing whereby the locking part moves independently of the release lever, the locking part being loaded by the support spring for transmitting a predetermined braking force to the lever in the locking position of the lever.

2. The latch according to claim 1, wherein the release lever has a third end face, wherein a surface normal of the third end face is aligned transversely to the third pivot axis and wherein the third end face abuts in the blocking position against a protrusion of the locking, which protrusion has a greatest extension aligned parallel to the third pivot axis in order to permit a movement of the locking from the locking position.

3. The latch according to claim 2, wherein a projection of the third end face onto a projection plane, which is aligned transversely to a surface normal of the third end face, intersects the third pivot axis.

4. The latch according to claim 2, wherein the locking housing is arranged between the second bearing and the third bearing to allow a pivoting movement of the locking between the locking position and a release position in a first pivoting direction and a pivoting movement of the release lever between the blocking position and the release position in the first pivoting direction, and wherein a pivoting movement of the lever from the locking position into the unlocking position takes place in a second pivoting direction opposite to the first pivoting direction.

5. The latch according to claim 2, wherein the first pivot axis, the second pivot axis of the second bearing and the third pivot axis are aligned parallel to one another.

6. The latch according to claim 1, wherein the release lever and the locking are assigned a spring to introduce torques directed in opposite directions onto the release lever and onto the locking and/or wherein the lever is assigned a spring which is designed for providing a torque directed into the release position onto the lever.

7. The latch according to claim 1, wherein the lever rests with a first end region on a housing section of a locking housing in the locking position and/or wherein a locking protrusion of the locking rests on a supporting surface which is arranged adjacent to a third end face of the release lever.

8. The latch according to claim 1, wherein the lever can be displaced from the locking position into the unlocking position without a movement of the locking out of the locking position and without a movement of the release lever out of the blocking position when the braking force exerted by the spring-elastically supported locking part is overcome.

9. The latch according to claim 1, wherein the locking housing is mounted on the base body so as to be linearly movable, and wherein the support spring is mounted to the base body to provide a spring force which is oriented in the direction of the release lever.

10. The latch according to claim 9, wherein a first control surface is formed on the locking housing and wherein a second control surface is formed on the lever, which first control surface and second control surfaces initiate a compressive movement on the spring when the lever is transferred from the unlocked position to the locked position.

11. The latch according to claim 10, wherein the first control surface is formed circular-cylindrical and a center axis of the first control surface is aligned parallel to first pivot axis of the first bearing and wherein the second control surface is formed as a plane or as a section of a cylindrical surface.

12. The latch according to claim 1, wherein the locking comprises a locking housing which is mounted movably on the second bearing and wherein the locking housing comprises a recess, which recess is oriented transversely with respect to the second bearing and which recess is located at a distance from the second bearing, wherein a spring and the locking part are received in the recess and wherein the locking part comprises a locking region which locking region projects beyond an outer surface of the locking housing.

13. The latch according to claim 12, wherein the locking region engages in a correspondingly formed recess in the lever, which recess is formed in a lever end face of the lever and wherein a surface normal of the lever end face being aligned transversely with respect to the first pivot axis.

\* \* \* \* \*